(12) United States Patent
Holl et al.

(10) Patent No.: US 12,584,932 B2
(45) Date of Patent: Mar. 24, 2026

(54) SLIDE IMAGING APPARATUS AND A METHOD FOR IMAGING A SLIDE

(71) Applicant: Roche Molecular Systems, Inc., Pleasanton, CA (US)

(72) Inventors: Konstantin Holl, Mannheim (DE); Alexander Maier, Mannheim (DE); Denny Osswald, Mannheim (DE); Marc Rehberger, Mannheim (DE); Bernardo Spring De Souza, Mannheim (DE); Michael Weiser, Mannheim (DE)

(73) Assignee: Roche Molecular Systems, Inc., Pleasanton, CA (US)

( * ) Notice: Subject to any disclaimer, the term of this patent is extended or adjusted under 35 U.S.C. 154(b) by 469 days.

(21) Appl. No.: 17/953,132

(22) Filed: Sep. 26, 2022

(65) Prior Publication Data

US 2023/0088303 A1 Mar. 23, 2023

Related U.S. Application Data

(63) Continuation of application No. PCT/EP2021/057884, filed on Mar. 26, 2021.

(30) Foreign Application Priority Data

Mar. 27, 2020 (EP) ..................................... 20166155

(51) Int. Cl.
G01N 35/00 (2006.01)
(52) U.S. Cl.
CPC ... G01N 35/00029 (2013.01); G01N 35/0099 (2013.01)
(58) Field of Classification Search
CPC ..................... G01N 35/0099; G01N 35/00029
See application file for complete search history.

(56) References Cited

U.S. PATENT DOCUMENTS

| | | | |
|---|---|---|---|
| 6,118,582 A | 9/2000 | Del Buono | |
| 6,522,774 B1 | 2/2003 | Bacus et al. | |

(Continued)

FOREIGN PATENT DOCUMENTS

| | | |
|---|---|---|
| AU | 2008201457 A1 | 4/2008 |
| DE | 10 2013 205 001 B3 | 5/2014 |

(Continued)

OTHER PUBLICATIONS

International Search Report and Written Opinion of the International Searching Authority for corresponding International Application No. PCT/EP2021/057884, dated May 25, 2021, 27 pgs.

(Continued)

*Primary Examiner* — Stephen S Hong
*Assistant Examiner* — Carl E Barnes, Jr.
(74) *Attorney, Agent, or Firm* — Womble Bond Dickinson (US) LLP

(57) ABSTRACT

A slide imaging apparatus includes: at least one first imaging device and at least one second imaging device, each configured to generate an image of a sample mounted on a slide; a storage device loadable with a plurality of slides; and a supply device configured to selectively supply the slides from the storage device to the at least one first imaging device or to the at least one second imaging device, wherein the at least one first imaging device and the at least one second imaging device comprise at least one visual indicator configured to indicate an operational status of the at least one first imaging device and the at least one second imaging device, wherein the slide imaging apparatus further comprises at least one vision sensor configured to detect an operational status of the at least one first imaging device and the at least one second imaging device using the at least one visual indicator.

19 Claims, 3 Drawing Sheets

(56)                    References Cited

U.S. PATENT DOCUMENTS

| | | |
|---|---|---|
| 6,640,014 B1 | 10/2003 | Price et al. |
| 6,711,283 B1 | 3/2004 | Soenksen |
| 7,682,573 B1 | 3/2010 | DeBolt |
| 8,712,116 B2 | 4/2014 | Gouch |
| 9,116,035 B2 | 8/2015 | Gouch et al. |
| 11,280,803 B2 * | 3/2022 | Von Bueren ........... H04N 23/90 |
| 2007/0057106 A1 | 3/2007 | Scampini |
| 2015/0104826 A1* | 4/2015 | Ritterbush ....... G01N 35/00029 |
| | | 536/25.41 |
| 2015/0226759 A1 | 8/2015 | Connolly et al. |
| 2020/0278362 A1* | 9/2020 | Hayut .............. G01N 35/00029 |
| 2020/0400930 A1* | 12/2020 | D'Costa ................. G16H 10/40 |
| 2022/0404241 A1* | 12/2022 | Yagci ...................... B01L 9/523 |

FOREIGN PATENT DOCUMENTS

| | | | |
|---|---|---|---|
| EP | 0 245 089 A2 | 11/1987 | |
| EP | 053 4247 B1 | 3/1993 | |
| EP | 3 324 190 A1 | 5/2018 | |
| JP | 2018-112920 A | 12/2019 | |
| WO | WO-2005005992 A2 * | 1/2005 | ......... G01N 31/1002 |
| WO | WO 2013/017855 A1 | 2/2013 | |
| WO | WO-2019097523 A1 * | 5/2019 | ....... G01N 35/00029 |

OTHER PUBLICATIONS

European Office action issued in corresponding application No. EP 21 714 183.7, dated Nov. 17, 2025, 36 pages.

* cited by examiner

SLIDE IMAGING APPARATUS AND A METHOD FOR IMAGING A SLIDE

CROSS-REFERENCE TO RELATED APPLICATION

This application is a bypass continuation application of International Application PCT/EP2021/057884, filed Mar. 26, 2021, which claims priority to and the benefit of European Patent Application No. 20 166 155.0, filed in the European Intellectual Property Office on Mar. 27, 2020, the entire content of each of which are incorporated herein by reference

BACKGROUND

1. Field

The present disclosure relates to a slide imaging apparatus and to a method for imaging a plurality of slides. Herein, the slide imaging apparatus can, be used in digital pathology; however, further uses are feasible.

2. Description of the Related Art

A slide imaging apparatus comprises an imaging device which is configured to generate an image of a sample mounted on a slide. The image generated by a modern imaging device is, typically, a digital image, and such an image may, therefore, be referred to as a "digital slide". Typically, the sample mounted on the slide is a biological specimen, such as a tissue sample. Typically the slide is a glass slide. Typically, a slide imaging apparatus is used in digital pathology, which can be understood as an image-based information environment that enables management of information generated from a digital slide.

Where an imaging device is capable of generating an image which may cover a majority or a complete surface of a slide, e.g. by using a scanning process, the corresponding slide imaging apparatus may be referred to as a "whole slide imaging" apparatus. A slide imaging apparatus may use a 2D (two-dimensional) camera or a line scan detector to generate the image of a sample mounted on a slide. Examples of a slide imaging apparatus are, for example, described in EP 0 053 4247 B1, EP 0 245 089 A2, U.S. Pat. Nos. 6,118,582 A, 6,522,774 B1, 6,640,014 B1, 6,711,283 B1, 7,682,573 B1, WO 2013/017855, U.S. Pat. Nos. 8,712,116 B2 and 9,116, 035 B2.

In general, an imaging device has a capacity of processing between 1 and 1,000 slides simultaneously. Typically, a distinction can be made between an imaging device having a low throughput, which relates to a simultaneous processing of less than 10 slides, and an imaging device having a high throughput, which refers to the simultaneous processing of more than 100 slides, wherein an imaging device configured to simultaneously process 10 to 100 slides could, thus, be denoted as an imaging device having a moderate throughput. In order to charge the imaging device with one or more slides, individual slides are, typically, inserted in a manual fashion into a slide repository, particularly selected from a slide tray or a slide rack, which is, subsequently, introduced into the imaging device for generating the desired image of a sample mounted on a slide.

However, the processing of the slides, typically, stops in a known slide imaging apparatus after occurrence of a failure in the corresponding imaging device until the failure has been remedied. As a consequence thereof, a stop of the processing of the slides may lead to a complete halt in the whole process as performed in the pathology unless a backup imaging device can be used. However, the backup imaging device still leads, in general, to a delay in the processing of the slides which are still to be processed and are already charged in the imaging device having the failure. Rather, the slides that have already been inserted into a slide reception of the imaging device have to be removed from the slide reception of the imaging device and introduced into the backup imaging device in a manual fashion. By way of example, a particular imaging device having a high through-put has been charged with 360 slide, wherein, however, a failure occurs already after 60 slides. As a consequence thereof, the 300 remaining slides which cannot be further processed in the particular imaging device have to be transferred to a backup imaging device in a manual fashion. Such a consequence can be, particularly, detrimental in an overnight processing of slides, thus, resulting in a delayed procedure on the next day in the pathology.

WO 2019/097523 A1 discloses a microscope system comprising a plurality of microscope modules, a cassette for holding a plurality of slides, a slide loader configured to move the plurality of slides between the cassette and the plurality of microscope modules, and a processor coupled to the slide loader. The processor may be configured with instructions which, when executed, cause the slide loader to move a slide into or from a selected microscope module among the plurality of microscope modules. Various other methods, systems, and computer-readable media are also disclosed.

US 2007/057106 A1 discloses a configurable slide imaging system including a plurality of slide cassettes, each cassette configured for accessibly storing a plurality of specimen slides, a plurality of imagers, each operatively coupled with one or more processors for processing images obtained of respective specimen slides retrieved from the storage cassettes, and a slide transport system including a movable arm having a slide engagement mechanism, the slide transport system configured for retrieving slides from the slide cassettes and positioning them on a slide stage of a respective-imager, and for retrieving slides from a slide stage of an imager and transporting them to a respective storage cassette. The number of imagers may be selected, and their operation synchronized, so as to minimize down time of the extendable arm.

EP 3 324 190 A1 discloses an apparatus including a first and a second imaging module; a storage module; an auto-mated transport module operable to transport at least one slide; and a controller operable to direct transport of the at least one slide by the transport module into the first imaging module and into the second imaging module. Also disclosed are a method and a machine-readable medium including program instructions to cause a controller to perform a method including transporting at least one slide to a first imaging module using an automated transport module; cap-turing by the first imaging module of an image of a specimen on the at least one slide; transporting the at least one slide to a storage module using the automated transport module; and transporting the at least one slide to a second imaging module in response to a request for capturing an image in addition to the image captured by the first imaging module.

DE 10 2013 205 001 B3 discloses an arrangement having an inspection unit formed for optical detection of a sample region, wherein the inspection unit comprises a microscope. Another inspection unit is provided having another micro-scope which is spatially spaced from the former inspection unit. A positioning unit is provided with which the probe is transported by the former inspection unit in the optical detection region of the latter inspection unit after the optical detection of a sample region. The sample region is optically detected by the latter inspection unit. Further, a method for optical detection of section sections, particularly a sample region on a sample, is disclosed.

Therefore, it may be desirable to provide a slide imaging apparatus and a method for imaging a plurality of slides enabling an uninterrupted processing of the slides to be processed in an imaging device, wherein the slides are provided to be introduced into a slide reception of an imaging device.

In particular, it may be desirable to enable an improved processing of the slides in the event of a failure of the imaging device, wherein the failure comprises a stop of the processing of the slides by the imaging device. Herein, it is, especially, desirable that the improved processing of the slides avoids a manual handling of the slides in the event of the failure of the imaging device.

SUMMARY

The aforementioned problem is addressed by a slide imaging apparatus and a method for imaging a plurality of slides with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the to invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Disclosed and proposed herein is a slide imaging apparatus. The term "slide" as used herein is a broad term and is to be given its ordinary and customary meaning to a person of ordinary skill in the art and is not to be limited to a special or customized meaning. The term may, specifically, refer, without limitation, to a substrate which is designated for a sample to be mounted on a surface of the slide. The term "sample" as used herein is a broad term and is to be given its ordinary and customary meaning to a person of ordinary skill in the art and is not to be limited to a special or customized meaning. The term may, specifically, refer, without limitation, to a biological specimen, such as a tissue sample. However, other kinds of samples may also be feasible.

In particular for a purpose of carrying the sample without any changes during the processing to the slide, the substrate is mechanically stable and can, therefore comprise any material which provides sufficient mechanical stability. In particular for a purpose of carrying a biological specimen, the substrate may exhibit a surface which is configured to be compatible with biological material. By way of example, the slide is a glass slide since glass is known, on one hand, to provide sufficient mechanical stability and, on the other hand, to have a high compatibility with biological material. However, further kinds of materials for the slides may also be feasible.

Further, the slide may, in particular, have a form which may enable imaging of the sample mounted on the slide. The terms "imaging" or "generate an image" as used herein are broad terms and are to be given their ordinary and customary meaning to a person of ordinary skill in the art and are not to be limited to a special or customized meaning. The terms may, specifically, refer, without limitation, to providing a 2D two-dimensional representation of at least one property of the sample, also denoted by the term "image", which can typically, be processed and displayed on a screen for being regarded by eyes of a viewer, for example, without any further aids, apart from eyeglasses of the viewer. For this purpose an imaging device as disclosed above in more detail is, typically, used.

Further, the terms "apparatus" and "slide imaging apparatus" as used herein are broad terms and are to be given their ordinary and customary meaning to a person of ordinary skill in the art and are not to be limited to a special or customized meaning. The terms may, specifically, refer, without limitation, to a device having a plurality of components as disclosed below in more detail.

In particular, the slide imaging apparatus comprises: at least one first imaging device and at least one second imaging device, each configured to generate an image of a sample mounted on a slide; a storage device loadable with a plurality of slides and configured to store the slides; and a supply device configured to selectively supply the slides from the storage device to the first imaging device or to the second imaging device.

Accordingly, the slide imaging apparatus comprises at least one first imaging device and at least one second imaging device, wherein each of the first and of the second imaging device is configured to generate an image of a sample mounted on a slide independently from each other. The term "imaging device" as used herein is a broad term and is to be given its ordinary and customary meaning to a person of ordinary skill in the art and is not to be limited to a special or customized meaning. The term may, specifically, refer, without limitation, to a device which is designated for generating a 2D representation of at least one visual property of the sample. In particular, the imaging device may be selected from a 2D camera or a line scan detector. However, further kinds of imaging devices may also be feasible. Consequently, the slide imaging apparatus according to the present invention may comprise two, three, four, five, six, or more individual imaging devices, wherein each of the individual imaging devices can be individually addressed by the supply device as disclosed below in more detail. Herein, the further imaging devices could, in particular, be maintained as a further backup option in case of failure of more than one imaging device.

For a purpose of generating the desired image of the sample, the slide may, for example, be a plate having a 2D extension and a thickness, wherein the 2D extension of the plate may, for example, exhibit a rectangular or circular form, and wherein the thickness of the plate may be small compared to a size of the extension, preferably 20%, more preferred 10%, in particular 5%, or less than a measure for a linear extent of the 2D extension of the plate.

Further, the terms "first" and "second" as used herein are broad terms and are to be given their ordinary and customary meaning to a person of ordinary skill in the art and are not to be limited to a special or customized meaning. The terms may, specifically, refer, without limitation, to two individual imaging devices without any rank or order, such that the terms can be exchanged between each other. Herein, the two individual imaging devices can, for example, comprise two copies of the same type of imaging device or, alternatively, comprise two different types of imaging devices.

The slide imaging apparatus further comprises a storage device which is loadable with a plurality of slides and configured to store the slides. For the term "slide" reference may be made to the definition as provided above. The term "storage device" as used herein is a broad term and is to be given its ordinary and customary meaning to a person of ordinary skill in the art and is not to be limited to a special or customized meaning. The term may, specifically, refer, without limitation, to a slide repository which is designated for receiving an individual slide holder or, alternatively, more than one slide holder simultaneously, wherein each slide holder is configured to hold more than one slide. According to some embodiments, the storage device may comprise at least two compartments, wherein each of the compartments is configured to store a portion of the slides. Herein, the compartments may comprise at least two rows which are placed in an adjacent manner, thus, storing the slides next to one another. In particular, the storage device may be selected from a slide tray or a slide rack, however, further types of storage devices may also be feasible. However, further kinds of arrangements of the slides and/or the slide holders, respectively, in the storage device may also be feasible. Thus, the storage device may be loadable with the plurality of slides, for example, in a manual fashion, wherein, however, an automatic loading of the storage device may also be conceivable.

The slide imaging apparatus further comprises a supply device which is configured to selectively supply the slides from the storage device to the first imaging device or to the second imaging device. The term "supply device" as used herein is a broad term and is to be given its ordinary and customary meaning to a person of ordinary skill in the art and is not to be limited to a special or customized meaning. The term may, specifically, refer, without limitation, to a device which is configured to transfer the slides from the storage device selectively to the first imaging device and the second imaging device. For this purpose, the supply device may comprise a robotic arm. Herein, the term "robotic arm" as used herein is a broad term and is to be given its ordinary and customary meaning to a person of ordinary skill in the art and is not to be limited to a special or customized meaning. The term may, specifically, refer, without limitation, to a programmable mechanical unit having a form of at least one of a hand or an arm and configured to move in a similar manner as the hand or the arm, using an electrical and/or pneumatic drive, including but not limited to gripping at least one object, in particular a slide or a slide holder, and transferring it to a defined destination.

This kind of setup of the slide imaging apparatus as disclosed herein is, thus, in particular contrast to known slide imaging apparatuses, in which a single slide or a slide holder is, after being loaded with the one or more slides, subsequently introduced into the imaging device for generating the desired image of a sample mounted on the at least one slide. In the slide imaging apparatus as disclosed herein, the plurality of the slides is loaded, in contrast to known slide imaging apparatuses, into the storage device, where the slides are stored until they are selectively supplied from the storage device to the at least one first imaging device or to the at least one second imaging device, wherein the image of a sample being mounted on the slide is generated. Herein, the supplying of the slides from the storage device selectively to the first imaging device and the second imaging device is, for example, performed in an automated fashion. The terms "in an automated fashion" and "automatedly" as used herein are broad terms and are to be given its ordinary and customary meaning to a person of ordinary skill in the art and are not to be limited to a special or customized meaning. The terms may, specifically, refer, without limitation, to a kind of process which is performed without direct interaction of a user of the slide imaging apparatus on a basis of an algorithm configured to perform the transfer of the slides without manual performance of the user. Further, the term "selectively" as used herein is a broad term and is to be given its ordinary and customary meaning to a person of ordinary skill in the art and is not to be limited to a special or customized meaning. The term may, specifically, refer, without limitation, to a manner of decision between two or more alternatives, wherein the decision is taken by a predefined algorithm.

In particular, the decision may be taken in an automated fashion by an operating system, wherein the operating system as comprised by the slide imaging apparatus is configured to share the scanning of the plurality of the slides according a predefined algorithm which may be based on the following principles: share the scanning of the plurality of the slides between the at least one first imaging device and the at least one second imaging device, for example, in an equal fashion, as long as both the at least one first imaging device and the at least one second imaging device are available, in particular in order to obtain a similar utilization rate for the imaging devices; however, scan the plurality of the slides in a single imaging device which is available, in particular to avoid a stop of the scanning procedure in case of a failure of a particular imaging device; stop scanning in the unlikely event that both the at least one first imaging device and the at least one second imaging device are not available.

The term "available" as used herein is a broad term and is to be given its ordinary and customary meaning to a person of ordinary skill in the art and is not to be limited to a special or customized meaning. The term may, specifically, refer, without limitation, to an operational status during which the corresponding imaging device is ready for scanning a slide. However, the operational status of the imaging device may, further assume a non-availability status, in particular during a warm-up phase or during a defect of the corresponding imaging device.

Thus, the operating system may be aware of the operational status of each of the at least one first imaging device and of the at least one second imaging device, wherein the operational status of each imaging device is used for determining whether the respective imaging device is available or not. For this purpose, a direct connection may be provided between an output of each imaging device and a computer on which the operating system may be running. Alternatively or in addition, the slide imaging apparatus may, further, comprise least one vision sensor configured to detect an operational status of the at least one first imaging device and of the at least one second imaging device using at least one indicator, in particular at least one visual indicator, for example, in the form of one or more light emitting diodes (LEDs), configured to indicate a corresponding operational status of the imaging devices. As a result, an individual pattern may be generated in this fashion for each imaging device, wherein the term "pattern" refers to a visual configuration being displayed by the at least one indicator, in particular the at least one visual indicator, for example, the at least one LED, of the corresponding imaging device. Consequently, the operational status of each imaging device may be related to the individual pattern as determined for each imaging device. Thus, recording the individual pattern of each imaging device by the at least one vision sensor may directly provide the desired information about the operational status of each imaging device.

In general, the supply device may be configured to process the slides or the slide holders, respectively, along a predetermined routine route, for example, starting on a top row and continuing to a bottom row of the storage device. In a particular embodiment, the storage device may, further, comprise a fast lane. The term "fast lane" as used herein is a broad term and is to be given its ordinary and customary meaning to a person of ordinary skill in the art and is not to be limited to a special or customized meaning. The term may, specifically, refer, without limitation, to a partition of the storage device configured to store at least one sample mounted to a designated slide, wherein each designated slide is determined for privileged processing outside the predetermined routine route as typically used by the supply device. In this fashion, a specifically designated slide may be processed further in accordance with a particular desire of a user of the slide imaging apparatus.

According to some embodiments, the supply device is configured to convey the slides, for example, after completion of a scanning process, back from the first imaging device or the second imaging device to the storage device, in particular to an associated position within the storage device into which the slides have been loaded. In other words, the supply device is configured to convey the slides back from the first imaging device or the second imaging device to the same position within the storage device into which the slides had been loaded before they were transferred from the storage device selectively to the first imaging device or to the second imaging device. Thus, a user of the slide imaging apparatus can receive back the slides in the same order in which they had been provided to the storage device, thus facilitating a subsequent identification and possible further processing of the slides.

Further, the slide imaging apparatus can, for example, comprise an operating system which may be configured to control the operation of at least one component of the slide imaging apparatus that may, in particular, be selected from at least one of the supply device, the first imaging device and the second imaging device. For this purpose, the operating system may comprise at least one computer, at least one input device configured to input instructions to the computer and at least one display device. Herein, the input device may, for example, comprise a keyboard. Further, the display device may, for example, be configured to present at least one item of information related to the operational status of the slide imaging apparatus to the user. However, further information may, further, be provided.

According to some embodiments of the present invention, the operating system can be designated to control the operation of the supply device by using the information about the operational status of each imaging device, especially the individual pattern as acquired by the at least one vision sensor for each imaging device. In particular, the operation of the supply device can be adapted to deliver a slide or a slide holder only to and/or discharge the slide or the slide holder only from an imaging device which is currently available. In other words, the operating system may take into account that at least one particular imaging device may, currently, not be available and modify the operation of the supply device, accordingly.

As a result thereof, the operation of the slide imaging apparatus could be maintained in a largely undisturbed fashion even in case of a failure of one of the imaging devices, thereby maintaining the throughput of the slide imaging apparatus to the same or nearly the same level. In the event of a potential failure, the operating system could rearrange a mode of the operation of the supply device in a manner that only the at least one currently available imaging device is delivered or discharged. In other words, the slide imaging apparatus could be operated continuously in case of a failure or could resume operation only after a considerably short time interval, which may be required by the operating system for rearranging an operational mode of the supply device. Moreover, this kind of arrangement could, during operation of the slide imaging apparatus, facilitate access of a user of the slide imaging apparatus or service personnel looking after the slide imaging apparatus to a potentially defective imaging device, in particular, for checking and, if required, repairing the defective imaging device.

Further, the slide imaging apparatus may comprise at least one monitor which is configured to show at least one image, for example, a plurality of images, in a presentation which can be viewed by a user of the slide imaging apparatus. In particular, the monitor can be mounted to a pivotable holder in order to facilitate viewing of the at least one image by a user from various positions.

Further arrangements of the slide imaging apparatus may be conceivable. Accordingly, the slide imaging apparatus may, further, comprise a frame, particularly a frame having wheels, a first plate connected to the frame and a second plate connected to the frame, wherein the first imaging device may be arranged on the first plate, and wherein the second imaging device may be arranged on the second plate. Herein, the first plate and the second plate may be extendable from the frame independently on one another, thus, improving access to each imaging device for service personnel. However, the plates may be dispensable in an embodiment in which the at last one imaging device may be considered as too delicate to be moved. According to some embodiments, the first imaging device and the second imaging device can be arranged in an adjacent manner with respect to each other, especially, one above the other in a vertical fashion or, as an alternative, next to each other in a horizontal fashion. In general, an adjacent arrangement of the imaging devices may facilitate reaching the at least one first imaging device and the at least one second imaging device by the robotic arm of the supply device. Further, the slide imaging apparatus may comprise a table, wherein at least the storage device and the supply device can be mounted to the table. Further, the slide imaging apparatus may comprise a housing at least partially encompassing the supply device, wherein the housing can comprise a safety door and a safety switch configured to detect a state of the safety door. Further, the slide imaging apparatus can comprise an emergency stop switch and, in addition, an emergency stop button, wherein the emergency stop switch can be operable using the emergency stop button. For additional details concerning further example arrangements of the slide imaging apparatus, reference can be made to the embodiments as disclosed below.

Further disclosed and proposed herein is a method for imaging a plurality of slides, wherein the method comprises the following steps: loading a plurality of slides into a storage device and storing the slides in the storage device; selectively supplying the slides from the storage device to at least one first imaging device or to at least one second imaging device; and generating an image of a sample mounted on the slide using the first imaging device or the second imaging device.

In particular, the method may commence with step a), whereinafter steps b) and c) can, consecutively, be repeated for any or, for example, all slides as provided in step a). For this purpose, the slides may be supplied from the storage device in an automated fashion selectively to the first imaging device or to the second imaging device.

In addition, a further step d) may be performed as follows: conveying the slides from the first imaging device or from the second imaging device to the storage device.

As already indicated, the slides may, particularly, be conveyed to associated positions within the storage device into which the slides have been loaded. In other words, the slides may be conveyed to the same positions within the storage device into which the slides had been loaded before they were supplied from the storage device to the at least one first imaging device or to the at least one second imaging device.

For further details concerning the method for imaging a plurality of slides, reference may be made to the slide imaging apparatus as described elsewhere herein.

Further disclosed and proposed herein is a computer program including computer-executable instructions for performing the method according to the present invention in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps a) to d) as indicated above may be performed by using a computer or a computer network, for example, by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the specimens and/or certain aspects of performing the actual measurements.

Specifically, further disclosed herein are: a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

Advantageously, the slide imaging apparatus and the method for imaging a plurality of slides enable uninterrupted processing of the slides to be processed in an imaging device, wherein the slides are provided in a storage device loadable with a plurality of slides to be introduced into the imaging device. In particular, they enable improved processing of the slides in an event of a failure of any one of the imaging devices, wherein the failure comprises a stop of the processing of the slides by the faulty imaging device. Especially, the improved processing of the slides avoids a manual handling of the slides in the event of the failure of any one of the imaging devices. A stop of the scanning procedure can be reduced to a rather unlikely event in which both the at least one first imaging device and the at least one second imaging device are not available due to a fault.

Summarizing and without excluding further possible embodiments, the following embodiments may be envisaged:

Example embodiment 1: A slide imaging apparatus, comprising: at least one first imaging device and at least one second imaging device, each configured to generate an image of a sample mounted on a slide; a storage device loadable with a plurality of slides and configured to store the slides; and a supply device configured to selectively supply the slides from the storage device to the first imaging device or to the second imaging device.

Example embodiment 2: The slide imaging apparatus according to Embodiment 1, wherein the supply device is configured to automatedly supply the slides from the storage device to the first imaging device and the second imaging device.

Example embodiment 3: The slide imaging apparatus according to Embodiment 1 or 2, wherein the supply device is further configured to convey the slides from the first imaging device or the second imaging device to the storage device.

Example embodiment 4: The slide imaging apparatus according to Embodiment 3, wherein the supply device is configured to convey the slides from the first imaging device or the second imaging device to the storage device to associated positions within the storage device into which the slides have been loaded.

Example embodiment 5: The slide imaging apparatus according to any one of Embodiments 1 to 4, wherein at least one of the first imaging device and the second imaging device is selected from a 2D camera or a line scan detector.

Example embodiment 6: The slide imaging apparatus according to any one of Embodiments 1 to 5, wherein the storage device is loadable with slide holders, wherein the slide holders are configured to hold more than one slide.

Example embodiment 7: The slide imaging apparatus according to Embodiment 6, wherein the storage device is manually loadable with the plurality of the slides or of the slide holders.

Example embodiment 8: The slide imaging apparatus according to Embodiment 6 or 7, wherein the storage device is configured to store the slides or the slide holders in rows next to each other.

Example embodiment 9: The slide imaging apparatus according to any one of Embodiments 6 to 8, wherein the storage device comprises a rack configured to be loaded with the slides or the slide holders.

Example embodiment 10: The slide imaging apparatus according to any one of Embodiments 1 to 9, wherein the supply device comprises a robotic arm.

Example embodiment 11: The slide imaging apparatus according to Embodiment 10, wherein the robotic arm comprises a gripping device configured to grip the slide or the slide holder.

Example embodiment 12: The slide imaging apparatus according to Embodiment 11, wherein the gripping device has a protrusion.

Example embodiment 13: The slide imaging apparatus according to Embodiment 12, wherein the protrusion is configured to press an operating button of the first imaging device and/or of the second imaging device.

Example embodiment 14: The slide imaging apparatus according to Embodiment 12 or 13, wherein the protrusion is a lance-shaped or finger-shaped protrusion.

Example embodiment 15: The slide imaging apparatus according to any one of Embodiments 1 to 14, further comprising a fast lane configured to charge at least one of the first imaging device or the second imaging device with at least one sample mounted to a designated slide determined for privileged processing.

Example embodiment 16: The slide imaging apparatus according to any one of Embodiments 1 to 15, further comprising a frame, particularly a frame having wheels, a first plate connected to the frame and a second plate connected to the frame, wherein the first imaging device is arranged on the first plate, wherein the second imaging device is arranged on the second plate.

Example embodiment 17: The slide imaging apparatus according to Embodiment 16, wherein the first plate and the second plate are extendable from the frame independently on one another.

Example embodiment 18: The slide imaging apparatus according to any one of Embodiments 1 to 17, wherein the first imaging device and the second imaging device are arranged in an adjacent manner with respect to each other.

Example embodiment 19: The slide imaging apparatus according to Embodiments 18, wherein the first imaging device and the second imaging device are arranged one above the other or next to each other.

Example embodiment 20: The slide imaging apparatus according to any one of Embodiments 1 to 19, further comprising an operating system configured to control operation of at least one of the supply device, the first imaging device and the second imaging device.

Example embodiment 21: The slide imaging apparatus according to Embodiment 20, wherein the operating system comprises at least one computer, at least one input device configured to input instructions to the computer and at least one display device.

Example embodiment 22: The slide imaging apparatus according to Embodiment 21, wherein the input device comprises a keyboard.

Example embodiment 23: The slide imaging apparatus according to any one of Embodiments 20 to 22, wherein the operating system is configured to control selectively supplying the slides from the storage device to the first imaging device or to the second imaging device according to a predefined algorithm which is based the following principles: share the scanning of the plurality of the slides between the at least one first imaging device and the at least one second imaging device as long as both the at least one first imaging device and the at least one second imaging device are available; scan the plurality of the slides in a single imaging device that is available; stop scanning in the event that both the at least one first imaging device and the at least one second imaging device are not available.

Example embodiment 24: The slide imaging apparatus according to any one of Embodiments 1 to 23, further comprising at least one monitor configured to present images of the samples mounted on the slide after scanning by the first imaging device or the second imaging device.

Example embodiment 25: The slide imaging apparatus according to Embodiment 24, wherein the at least one monitor is mounted to a pivotable holder.

Example embodiment 26: The slide imaging apparatus according to any one of Embodiments 1 to 25, further comprising a table, wherein at least the storage device and the supply device are mounted to the table.

Example embodiment 27: The slide imaging apparatus according to any one of Embodiments 1 to 26, further comprising a housing at least partially encompassing the supply device.

Example embodiment 28: The slide imaging apparatus according to Embodiment 27, wherein the housing comprises a safety door and a safety switch configured to detect a state of the safety door.

Example embodiment 29: The slide imaging apparatus according to any one of Embodiments 1 to 28, further comprising an emergency stop switch.

Example embodiment 30: The slide imaging apparatus according to Embodiment 29, further comprising an emergency stop button.

Example embodiment 31: The slide imaging apparatus according to Embodiment 30, wherein the emergency stop switch is operable using the emergency stop button.

Example embodiment 32: The slide imaging apparatus according to any one of Embodiments 1 to 31, wherein the first imaging device and the second imaging device comprise at least one indicator configured to indicate an operational status of the first imaging device and the second imaging device.

Example embodiment 33: The slide imaging apparatus according to Embodiment 32, wherein the at least one indicator is or comprises at least one visual indicator.

Example embodiment 34: The slide imaging apparatus according to Embodiment 32 or 33, wherein the at least one indicator comprises at least one light emitting diode (LED).

Example embodiment 35: The slide imaging apparatus according to any one of Embodiments 32 to 34, wherein the slide imaging apparatus further comprises at least one vision sensor configured to detect an operational status of the first imaging device and the second imaging device using the at least one indicator.

Example embodiment 36: The slide imaging apparatus according to Embodiment 35, wherein the at least one vision sensor is designated for acquiring an individual pattern for each imaging device by recording a visual configuration as displayed by the at least one indicator of the corresponding imaging device.

Example embodiment 37: The slide imaging apparatus according to Embodiment 36, wherein, the operational status of each imaging device is related to the individual pattern as determined for each imaging device.

Example embodiment 38: The slide imaging apparatus according to any one of Embodiments 1 to 37, wherein the slide imaging apparatus comprises at least two first imaging devices and/or at least two second imaging devices.

Example embodiment 39: A method for imaging a plurality of slides, the method comprising: loading a plurality of slides into a storage device and storing the slides in the storage device; selectively supplying the slides from the storage device to at least one first imaging device or to at least one second imaging device; and generating an image of a sample mounted on the slide using the first imaging device or the second imaging device.

Example embodiment 40: The method according to Embodiment 39, wherein the slides are automatedly supplied from the storage device to the first imaging device or to the second imaging device.

Example embodiment 41: The method according to Embodiment 39 or 40, wherein the slides are selectively supplied from the storage device to the first imaging device or to the second imaging device according to a predefined algorithm which is based the following principles: share the scanning of the plurality of the slides between the at least one first imaging device and the at least one second imaging device as long as both the at least one first imaging device and the at least one second imaging device are available; scan the plurality of the slides in a single imaging device that is available; stop scanning in the event that both the at least one first imaging device and the at least one second imaging device are not available.

Example embodiment 42: The method according to any one of Embodiments 39 to 41, further comprising the following step: wherein the slides are conveyed from the first imaging device or from the second imaging device to the storage device.

Example embodiment 43: The method according to Embodiment 42, wherein the slides are conveyed to associated positions within the storage device into which the slides have been loaded.

BRIEF DESCRIPTION OF THE DRAWINGS

Further optional features and embodiments will be disclosed in more detail in the subsequent description of embodiments, for example, in conjunction with the dependent claims. Therein, the respective optional features may be realized in an isolated fashion as well as in any arbitrary feasible combination, as the skilled person will realize. The scope of the invention is not restricted by the example embodiments. The embodiments are schematically depicted in the Figures. Therein, identical reference numbers in these Figures refer to identical or functionally comparable elements.

In the Figures.

DETAILED DESCRIPTION

Figure 1:
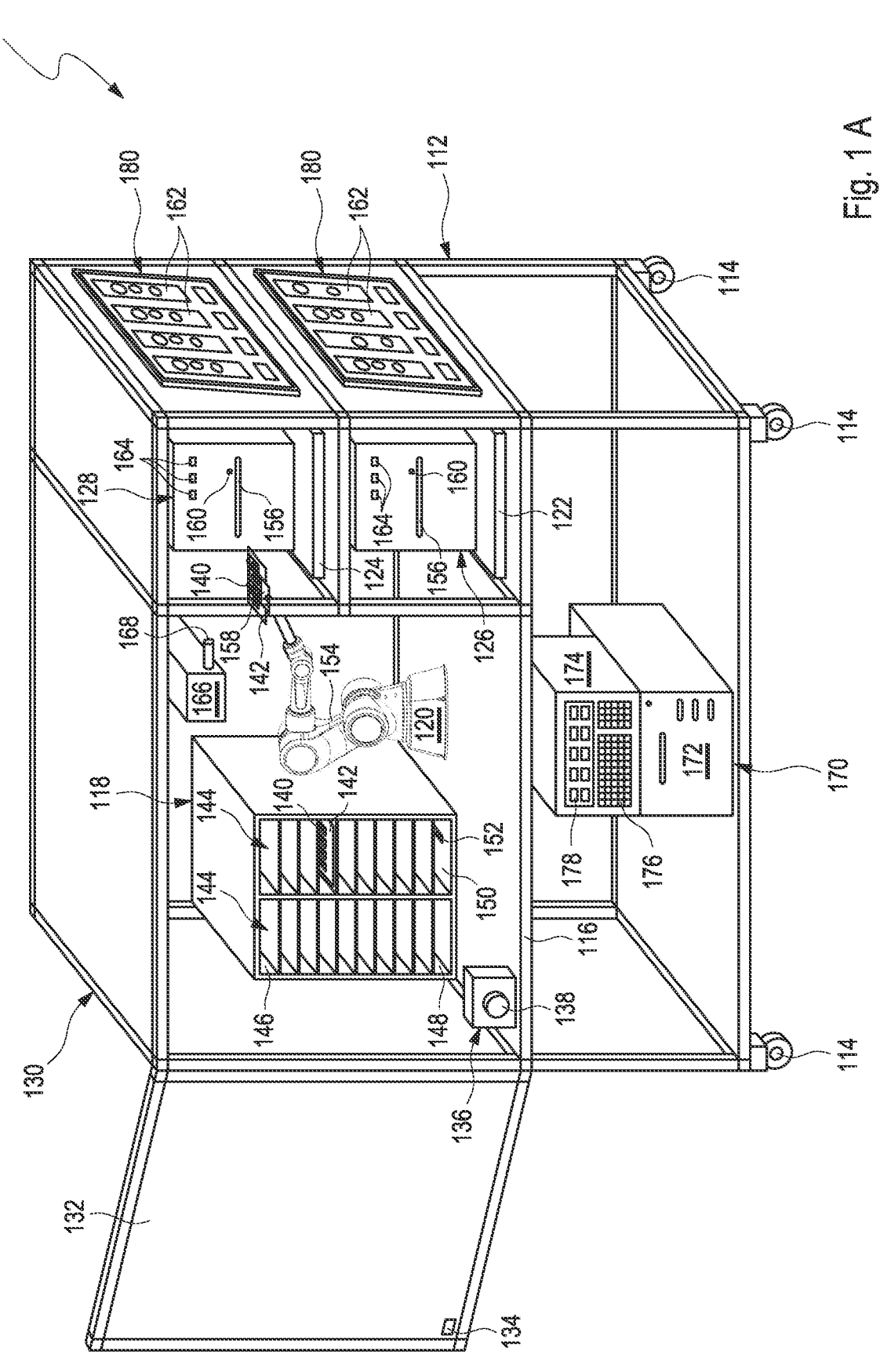
FIGS. 1A and 1B schematically illustrate aspects of a slide imaging apparatus according to some embodiments of the present disclosure in a side view.
Figure 1B:
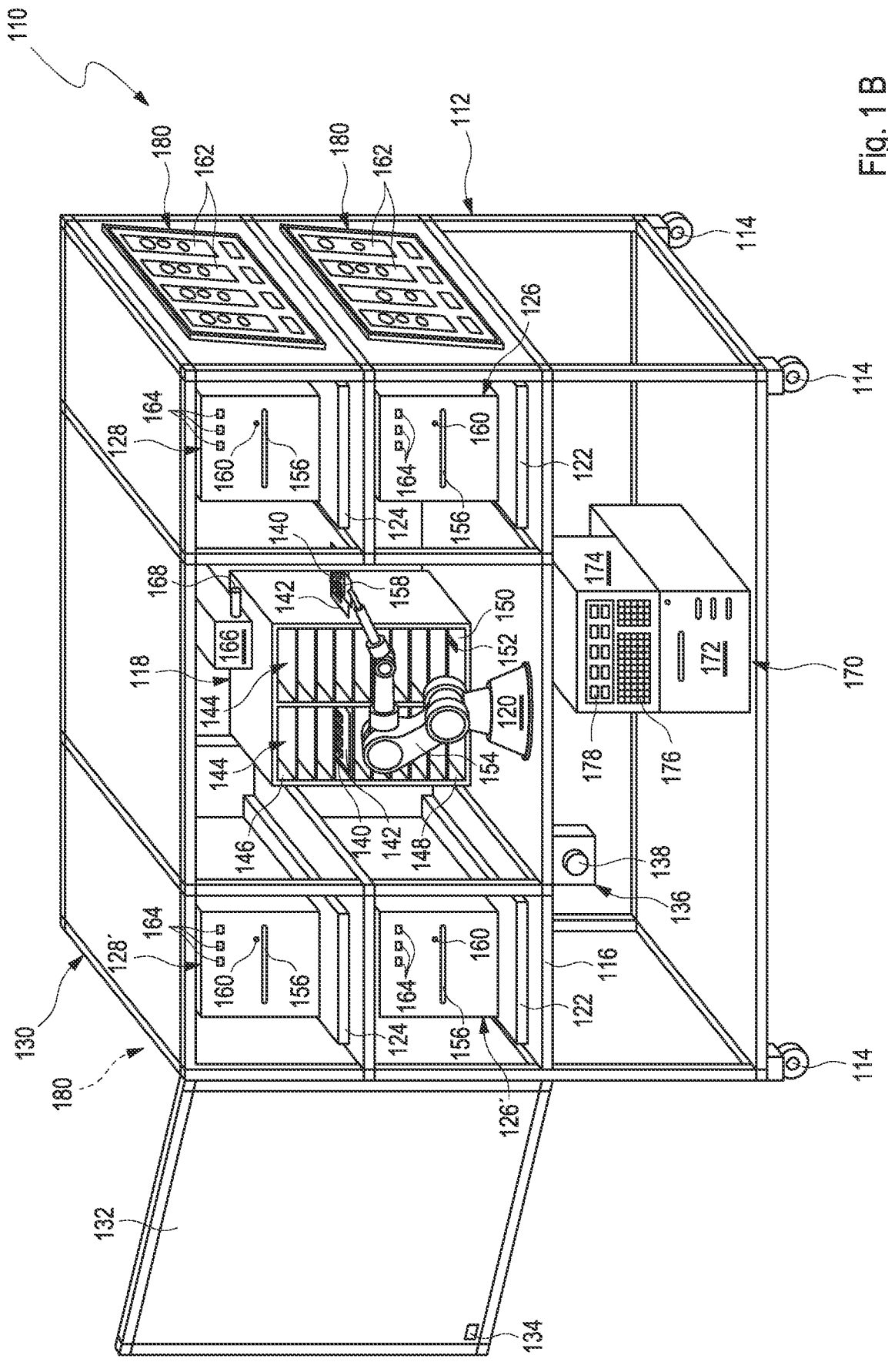

FIGS. 1A and 1B schematically illustrates aspects of a slide imaging apparatus 110 according to some embodiments of the present disclosure in a side view. As shown in FIGS. 1A and 1B, the slide imaging apparatus 110 may, for example, comprise a frame 112, wherein the frame 112 may, in particular, comprise wheels 114, thus, enabling the slide imaging apparatus 110 to be moved to a desired location. As further depicted in FIGS. 1A and 1B, the frame 112 further comprises a table 116, wherein at least a storage device 118 and a supply device 120 are mounted to the table 116. However, further kinds of arrangements for the storage device 118 and for the supply device 120 may also be conceivable.

Further according to the embodiment as illustrated in FIGS. 1A and 1B, a first plate 122 and a second plate 124 are connected to the frame 112, wherein a first imaging device 126 is arranged on the first plate 122, while a second imaging device 128 is arranged on the second plate 124. Consequently, the slide imaging apparatus 110 as schematically depicted in FIG. 1A comprise two individual imaging devices 126, 128. In a further embodiment as depicted in FIG. 1B, the slide imaging apparatus 110 comprises two pairs of individual imaging devices 126, 128; 126', 128'. However, in further embodiments (not depicted here), the slide imaging apparatus 110 may comprise three, five, six, or more individual imaging devices which can be individually addressed by the supply device 120 as disclosed above or below in more detail.

As a result of the particular arrangements as shown in FIGS. 1A and 1B, the first imaging device 126, 126' and the second imaging device 128, 128' are arranged one above the other. However, further kinds of arrangements for the first imaging device 126, 126' and for the second imaging device 128, 128' may also be conceivable, in particular as long as they can be reached by the supply device 120. In addition, the first plate 122 and the second plate 124 may, for example, be extendable from the frame 112, especially by using telescopic rails (not depicted here), in an independent fashion, in particular for facilitating access in the event of a service case. In this embodiment, an exact positioning can, for example, be achieved by depressions in the plates 122, 124 which are designed for receiving a respective base of the imaging devices 126, 128; 126', 128', respectively. However, further kinds of arrangements may also be feasible.

As further depicted in FIGS. 1A and 1B, the slide imaging apparatus 110 according to the present embodiment comprises a housing 130, which at least partially encompasses the supply device 120, thus, supporting an undisturbed operation of the supply device 120. As schematically illustrated in FIGS. 1A and 1B, the housing 130 has a safety door 132 and a safety switch 134, wherein the safety switch 134 is configured to detect a state of the safety door 132, such as open state or a closed state of the safety door 132. However, further kinds of safety provisions may also be possible.

Further, the embodiment of the slide imaging apparatus 110 as depicted in FIGS. 1A and 1B, comprises an emergency stop switch 136, wherein the emergency stop switch 136 is operable here using an emergency stop button 138. However, further kinds of emergency provisions may also be feasible. Upon pressing the emergency stop button 138, the emergency stop switch 136 can induce an immediate stop of the operation of the slide imaging apparatus 110 if considered to be required by service personnel.

As schematically illustrated in FIGS. 1A and 1B, the storage device 118 is loadable with a plurality of slides 140 and configured to store the slides 140. In particular, the plurality of slides 140 may be manually loaded to the storage device 118. For this purpose, the storage device 118 may be loadable with at least one of individual slides and slide holders 142, wherein each slide holder 142 is configured to hold more than one slide 140. As further depicted in FIGS. 1A and 1B, the storage device 118 is configured to store the slides 140 or the slide holders 142, respectively, in rows 144 which are located in adjacent fashion next to each another. However, further arrangements of the storage device 118 may also be conceivable.

In general, the supply device 120 may be configured to process the slides 140 or the slide holders 142, respectively, along a predetermined routine route, for example, starting on a top row 146 and continuing to a bottom row 148 of the storage device 118. In a particular embodiment as depicted here, the storage device 118 may comprise a fast lane 150, wherein the fast lane 150 may be configured to store at least one sample mounted to a designated slide 152, wherein each designated slide 152 as located in the fast lane 150 is determined for privileged processing outside the predetermined routine route as normally used by the supply device 120.

As further schematically illustrated in FIG. 1A, the supply device 120 is configured to selectively supply the slides 140 from the storage device 118 to the first imaging device 126 or to the second imaging device 128. As further schematically illustrated in FIG. 1B, the supply device 120 may be configured to selectively supply the slides 140 from the storage device 118 to one of the first imaging devices 126, 126' or to one of the second imaging devices 128, 128'. According to some embodiments, the supply device 120 may be configured to automatedly supply the slides 140 from the storage device 120 selectively to the first imaging device 126, 126' or to the second imaging device 128, 128'. According to some embodiments, the operation of the supply device 120 can be determined by using the information about the operational status of each imaging device 126, 128; 126', 128', in particular, by adapting the operation of the supply device 120 to deliver the slide 140 or the slide holder 142 only to and/or to discharge the slide 140 or the slide holder 142 only from an imaging device which is currently available, thereby taking into account that at least one particular imaging device may, currently, not be available, whereby the operation of supply device may be modified, accordingly.

As schematically depicted there, the supply device 120 may comprise a robotic arm 154 which may, especially, be configured for introducing the slide 140 to a slide reception 156, in particular a slit, as comprised by each of the first imaging devices 126, 126' and the second imaging devices 128, 128', wherein the slide reception 156 is configured to receive the slide 140 for imaging purposes. Herein, the robotic arm 154 may comprise a gripping device 158 which is configured to grip the slide 140 or the slide holder 142, respectively. More particular, the gripping device 158 may have a protrusion (not depicted here), especially a lance-shaped or finger-shaped protrusion, which is configured to press an operating button 160 of the first imaging device 126, 126' or of the second imaging device 128, 128'. However, a further kind of arrangement of the supply device 120 may, still, be possible.

In addition, the supply device 120 may be configured to convey the slides 140 back from the first imaging device 126, 126' or from the second imaging device 128, 128' after scanning to the storage device 118. Thereafter, the slides 140 can be removed in a manual fashion from the storage device 118, thus, providing space for further slides 140. In particular, the supply device 120 can be configured to convey the slides 140 back from the first imaging device 126, 126' or from the second imaging device 128, 128' to the storage device 118 to associated positions within the storage device 118 into which the slides 140 have previously been loaded prior to scanning. As a result thereof, a user can receive back the slides 140 in the same order in which they had been provided to the storage device 118.

As already indicated above, the exemplary slide imaging apparatus 110 as illustrated in FIG. 1A comprises the first imaging device 126 and the second imaging device 128, wherein each of the first imaging device 126 and the second imaging device 128 are configured to generate an image 162 of a sample mounted on the slide 140. Similarly, each of the further first imaging device 126' and of the further second imaging device 128' are configured to generate the image 162 of a sample mounted on the slide 140, albeit not depicted in FIG. 1B. For this purpose, each of the first imaging devices 126, 126' of and the second imaging devices 128, 128' may, for example, be selected from a 2D camera or a line scan detector. However, further kinds of imaging devices may also be feasible.

In a particular embodiment, at least one of the first imaging devices 126, 126' and of the second imaging devices 128, 128' may comprise at least one indicator, in particular at least one visual indicator, for example, in the form of one or more LEDs 164, which are configured to indicate an operational status of the first imaging device 126, 126' or of the second imaging device 128, 128', respectively. In this particular embodiment, the slide imaging apparatus 110 may, as depicted in FIGS. 1A and 1B, further comprise at least one vision sensor 166 which is configured to detect an operational status of at least one of the first imaging device 126, 126' and the second imaging device 128, 128' using an indication as provided by the at least one visual indicator, in particular by the at least one visual indicator, for example, by the one or more LEDs 164. For this purpose, the vision sensor 166 may comprise an optical recording device 168 as schematically depicted in FIGS. 1A and 1B. In a further embodiment (not depicted here), the slide imaging apparatus 110 may comprise at least two individual vision sensors 166, wherein each individual vision sensor 166 may comprise an individual optical recording device 168, wherein each individual optical recording device 168 may be assigned to detect the operational status of an individual imaging device 126, 128; 126', 128'. However, further embodiments are still feasible.

In particular, an individual pattern may, thus, be generated for each individual imaging device 126, 128; 126', 128', wherein the pattern comprises a visual configuration being displayed by the at least one indicator, in particular the at least one visual indicator, for example, by the at least one LED 164, of the corresponding imaging device 126, 128; 126', 128'. Consequently, the recording of the individual pattern of each imaging device 126, 128; 126', 128' by the at least one vision sensor 166 may, thus, directly provide the desired information about the operational status of each individual imaging device 126, 128; 126', 128'. In this manner, the slide imaging apparatus 110 may have independent access to the operational status of the first imaging device 126, 126' or the second imaging device 128, 128', respectively, without being required to get this piece of information from the first imaging device 126, 126' and the second imaging device 128, 128' in a direct fashion. However, a direct communication between the first imaging device 126, 126' or the second imaging device 128, 128', on one hand, and an operating system 170, on the other hand, for providing the operational status of the first imaging device 126, 126' and the second imaging device 128, 128' may also be feasible.

As a result thereof, the operation of the supply device 120 can be determined by using the information about the operational status of each imaging device 126, 128; 126', 128', especially by using the individual pattern as, particularly, acquired by the at least one vision sensor 166 for each imaging device 126, 128; 126', 128', in a fashion that the operation of the supply device 120 may be adapted to deliver the slides 140 or the slide holders 142 only to and/or to discharge the slides 140 or the slide holders 142 only from an imaging device currently available. Thus, the operation of the slide imaging apparatus 110 could be undisturbed at least to a large extent even in case of a failure of one of the imaging devices 126, 128; 126', 128', in which event the operating system 170 could rearrange a mode of the operation of the supply device 120, accordingly. In addition, a user of the slide imaging apparatus 110 or service personnel looking after the slide imaging apparatus 110 could have largely undisturbed access to a potentially defective imaging device, particularly, in order to check and, if required, repair the defective imaging device. In an embodiment, access to the defective imaging device is facilitated by the first plate 122 or the second plate 124 being extendable from the frame 112, especially by using telescopic rails (not depicted here). In such embodiment, the user can check, and, if required, repair the defective imaging device, or even remove the defective imaging device from the slide imaging apparatus 110, without interrupting the operation of the slide imaging apparatus 110.

As indicated above, the slide imaging apparatus 110 may comprise an operating system 170 which can be configured to control the operation of one or more of the supply device 120, the at least one first imaging device 126, 126' and the at least one second imaging device 128, 128'. Herein, the operating system 170 may, for example, comprise a computer 172, an input device 174 configured to input instructions to the computer 170, wherein the input device 174 may comprise a keyboard 176, and at least one display device 178. Herein, the display device 178 can be used for displaying at last one item of information related to the operational status of the slide imaging apparatus 110.

Further, the slide imaging apparatus 110 may comprise at least one monitor 180, which may, for example, be mounted to a pivotable holder (not depicted here) in order to facilitate viewing the images 162 of the samples mounted on the slide 140 after being scanned by the at least one first imaging device 126, 126' or the at least one second imaging device 128, 128' by a user from various positions.

Figure 2:
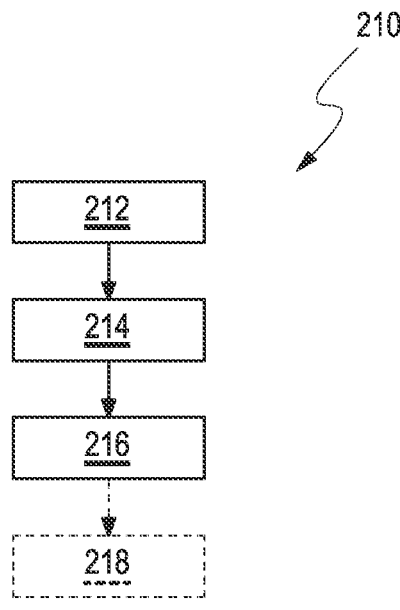
FIG. 2 schematically illustrates aspects of a method for imaging a plurality of slides according to some embodiments of the present disclosure.

FIG. 2 schematically illustrates an example embodiment of a method 210 for imaging a plurality of slides 140, wherein the method 210 comprises the following steps.

In a loading step 212 according to step a), a plurality of slides 140 is loaded into the storage device 118 and stored by the storage device 118. Herein the slides 140 may be loaded as individual slides 140 or by using a slide holder 142 configured to hold more than one slide 140.

In a supplying step 214 according to step b), the slides 140 are selectively supplied from the storage device 118 to the at least one first imaging device 126, 126' or to the at least one second imaging device 128, 128', for example, by using the supply device 120 in a consecutive manner. Herein, the slides 140 are, for example, supplied in an automated fashion from the storage device 118 to the at least one first imaging device 126, 126' or to the at last one second imaging device 128, 128'.

In an imaging step 216 according to step c), an image of a sample mounted on the slide 140 is generated using the at least one first imaging device 126, 126' or the at least one second imaging device 128, 128'. The image 162 may then be displayed on the monitor 180 as described above.

In a conveying step 218, the slides 140 may be conveyed from the at least one first imaging device 126, 126' or from the at least one second imaging device 128, 128', as individual slides 140 or by using a slide holder 142 configured to hold more than one slide 140, to the storage device 118, in particular, to associated positions within the storage device 118 into which the slides 140 have been loaded.

For further details concerning the method 210 for imaging a plurality of slides 140 reference may be made to the slide imaging apparatus 110 as described above.

---

LIST OF SOME OF THE REFERENCE NUMBERS

| | |
|---|---|
| 110 | slide imaging apparatus |
| 112 | frame |
| 114 | wheel |
| 116 | table |
| 118 | storage device |
| 120 | supply device |
| 122 | first plate |
| 124 | second plate |
| 126, 126' | first imaging device |
| 128, 128' | second imaging device |
| 130 | housing |
| 132 | safety door |
| 134 | safety switch |
| 136 | emergency stop switch |
| 138 | emergency stop button |
| 140 | slide |
| 142 | slide holder |
| 144 | row |
| 146 | top row |
| 148 | bottom row |
| 150 | fast lane |
| 152 | designated slide |
| 154 | robotic arm |
| 156 | slide reception |
| 158 | gripping device |
| 160 | operating button |
| 162 | image |
| 164 | light emitting diode (LED) |
| 166 | vision sensor |
| 168 | optical recording device |
| 170 | operating system |
| 172 | computer |
| 174 | input device |
| 176 | keyboard |
| 178 | display |
| 180 | monitor |
| 210 | method for imaging a slide |
| 212 | loading step |
| 214 | supplying step |
| 216 | imaging step |
| 218 | conveying step |

---

What is claimed is:

1. A slide imaging apparatus, comprising:

at least one first imaging device and at least one second imaging device, each configured to generate an image of a sample mounted on a slide;

a storage device loadable with a plurality of slides; and a supply device configured to selectively supply the slides from the storage device to the at least one first imaging device or to the at least one second imaging device;

an operating system configured to control operation of at least one of the supply device, the at least one first imaging device, or the at least one second imaging device, wherein the at least one first imaging device and the at least one second imaging device comprise at least one visual indicator configured to indicate an operational status of the at least one first imaging device and the at least one second imaging device by generating a visual pattern, wherein the slide imaging apparatus further comprises at least one vision sensor configured to detect the operational status of the at least one first imaging device and the at least one second imaging device based on the visual pattern generated by the at least one visual indicator, and wherein the at least one vision sensor is further configured to detect a failure of an imaging device of the at least one first imaging device and the at least one second imaging device based on the visual pattern generated by the at least one visual indicator and, in response, the operating system is further configured to rearrange a mode of operation of the supply device to only deliver to and discharge any available imaging devices of the at least one first imaging device and the at least one second imaging device.

2. The slide imaging apparatus according to claim 1, wherein the supply device is configured to automatedly supply the slides from the storage device to the at least one first imaging device and to the at least one second imaging device.

3. The slide imaging apparatus according to claim 1, wherein the supply device comprises a robotic arm.

4. The slide imaging apparatus according to claim 1, wherein at least one of the first imaging device or the second imaging device is selected from a 2D camera or a line scan detector.

5. The slide imaging apparatus according to claim 1, wherein the storage device is manually loadable with the plurality of slides.

6. The slide imaging apparatus according to claim 1, wherein the storage device is loadable with one or more slide holders, wherein the one or more slide holders are configured to hold more than one slide.

7. The slide imaging apparatus according to claim 1, wherein the supply device is configured to convey the slides from the at least one first imaging device or the at least one second imaging device to the storage device.

8. The slide imaging apparatus according to claim 7, wherein the supply device is configured to convey the slides from the at least one first imaging device and the at least one second imaging device to the storage device to associated positions within the storage device into which the slides have been loaded.

9. The slide imaging apparatus according to claim 1, further comprising a fast lane configured to charge at least one of the first imaging device or the second imaging device with at least one sample mounted to a designated slide determined for privileged processing.

10. The slide imaging apparatus according to claim 1, further comprising a frame, a first plate connected to the frame, and a second plate connected to the frame, wherein the at least one first imaging device is arranged on the first plate, wherein the at least one second imaging device is arranged on the second plate.

11. The slide imaging apparatus according to claim 1, wherein the at least one first imaging device and the at least one second imaging device are arranged one above the other.

12. The slide imaging apparatus according to claim 1, wherein the at least one visual indicator comprises at least one light emitting diode.

13. The slide imaging apparatus according to claim 1, wherein the at least one vision sensor is configured to acquire an individual pattern for each imaging device by recording a visual configuration as displayed by the at least one visual indicator of the corresponding imaging device.

14. A method for imaging a plurality of slides by a slide imaging apparatus, the method comprising:

loading a plurality of slides into a storage device and storing the slides in the storage device;

selectively supplying the slides from the storage device to at least one first imaging device or to at least one second imaging device; and

21 generating an image of a sample mounted on a slide of the plurality of slides using the at least one first imaging device or the at least one second imaging device, wherein the at least one first imaging device and the at least one second imaging device comprise at least one visual indicator configured to indicate an operational status of the at least one first imaging device and the at least one second imaging device by generating a visual pattern, wherein the slide imaging apparatus further comprises at least one vision sensor configured to detect the operational status of the at least one first imaging device and the at least one second imaging device based on the visual pattern generated by the at least one visual indicator, and wherein the at least one vision sensor is further configured to detect a failure of an imaging device of the at least one first imaging device and the at least one second imaging device based on the visual pattern generated by the at least one visual indicator and, in response, the slide imaging apparatus is configured to rearrange a mode of operation of the slide imaging apparatus to only deliver to and discharge any available imaging devices of the at least one first imaging device and the at least one second imaging device.

15. The method according to claim 14, wherein the slides are automatedly supplied from the storage device to the at least one first imaging device or to the at least one second imaging device.

16. The method according to claim 14, wherein at least one of the first imaging device or the second imaging device is selected from a 2D camera or a line scan detector.

17. The method of claim 14, wherein the storage device is loadable with one or more slide holders, wherein the one or more slide holders are configured to hold more than one slide.

18. The method of claim 14, further comprising conveying a slide, from among the slides, from the at least one first imaging device or the at least one second imaging device to the storage device.

19. The method of claim 14, wherein the at least one first imaging device and the at least one second imaging device are arranged one above the other.

* * * * *